C. ANDERSON.
FLOUR SIFTER.
APPLICATION FILED AUG. 15, 1916.

1,221,816.

Patented Apr. 10, 1917.
2 SHEETS—SHEET 1.

WITNESSES
W. C. Fielding
Ross J. Woodward

INVENTOR
Chris Anderson
BY
Richard Owen
ATTORNEY

C. ANDERSON.
FLOUR SIFTER.
APPLICATION FILED AUG. 15, 1916.
1,221,816.
Patented Apr. 10, 1917.
2 SHEETS—SHEET 2.
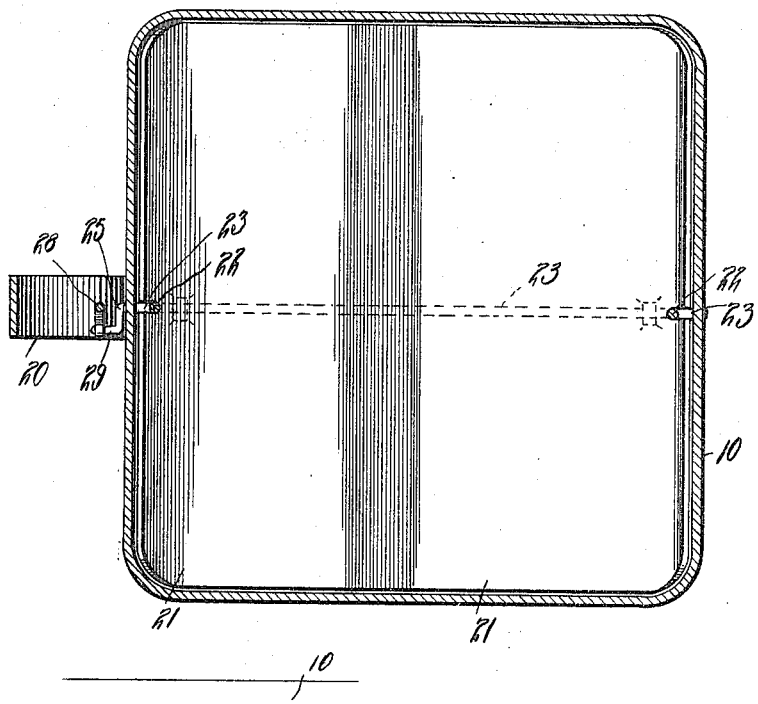
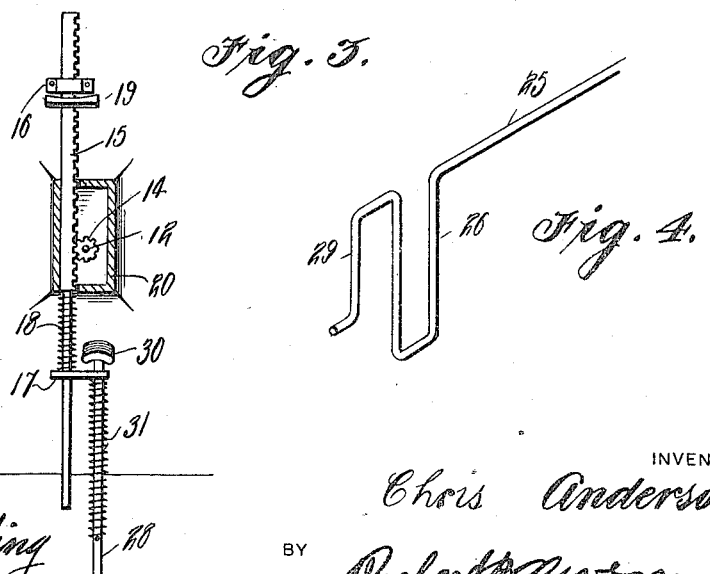
WITNESSES
W. C. Fielding
Roy J. Woodward
INVENTOR
Chris Anderson
BY
Richard Owen
ATTORNEY

UNITED STATES PATENT OFFICE.

CHRIS ANDERSON, OF PICKERT, NORTH DAKOTA.

FLOUR-SIFTER.

1,221,816.  Specification of Letters Patent.  Patented Apr. 10, 1917.

Application filed August 15, 1916. Serial No. 115,077.

*To all whom it may concern:*

Be it known that I, CHRIS ANDERSON, a subject of the Kingdom of Norway, but who has declared his intention to become a citizen of the United States, residing at Pickert, in the county of Steele and State of North Dakota, have invented certain new and useful Improvements in Flour-Sifters, of which the following is a specification.

This invention relates to an improved flour sifter and the principal object of the invention is to provide a flour sifter having an improved agitator actuating means and to further provide an improved closure for the lower portion of the sifter so that the flour will be prevented from wasting when the sifter is placed upon the table.

Another object of the invention is to provide improved actuating means for the agitator and movable closures, the actuating means being so located that the sifter may be operated with one hand.

Another object of the invention is to so construct this actuating mechanism that the closures will move to a closed position when the actuating mechanism is released and to so construct the actuating mechanism for the agitator that it will normally remain in a set position and be yieldably held in this position so that it may be operated with the thumb positioned above the upper end portion of the handle of the sifter.

This invention is illustrated in the accompanying drawings, wherein:—

Fig. 2 is a transverse sectional view taken along the line 2—2 of Fig. 1.

Fig. 3 is a fragmentary view of the actuating mechanism.

Fig. 4 is a fragmentary perspective view of the crank shaft forming part of the operating mechanism for the closure.

Figure 1:
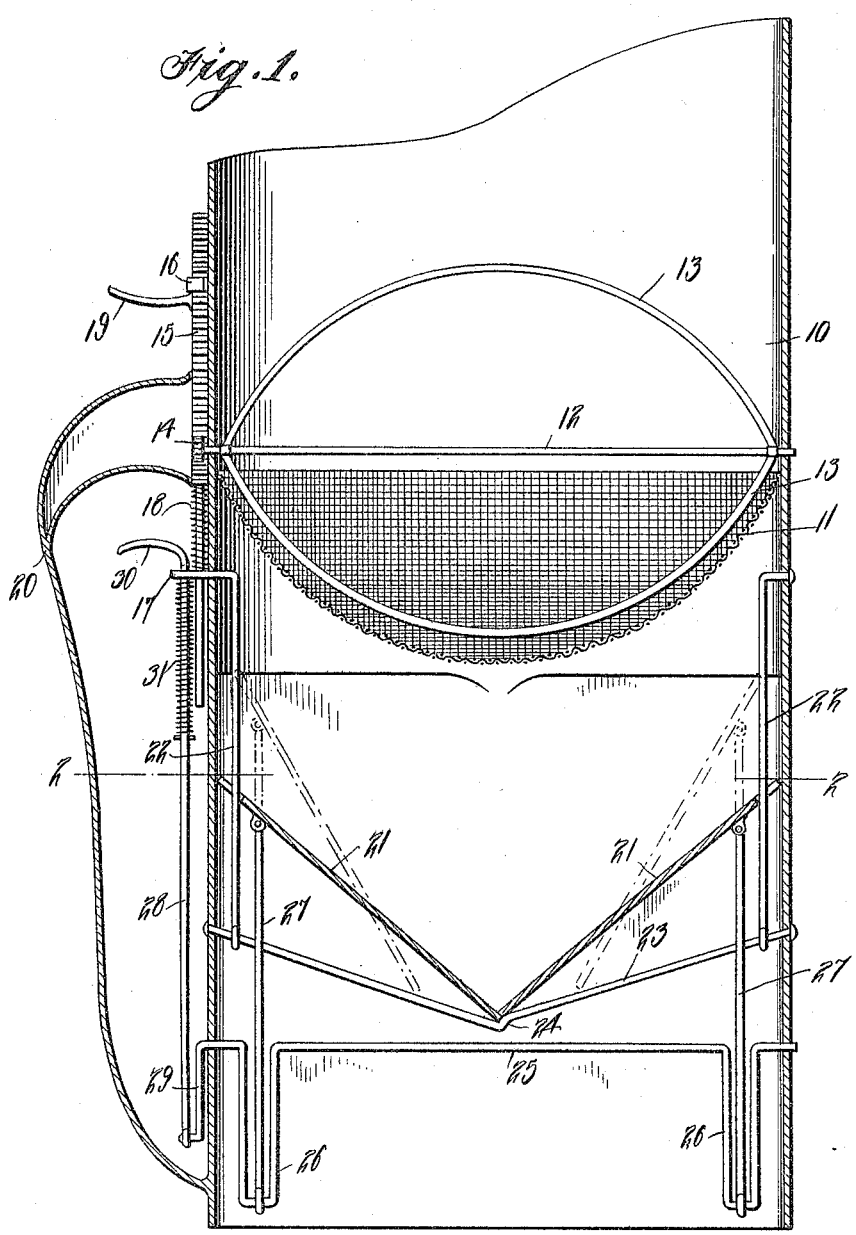
Figure 1 is a vertical sectional view through the improved sifter.

The sifter is provided with a body portion or casing 10 having a screening 11 placed therein preferably at a point above the vertical center thereof. The agitator shaft which carries the arms 13 is rotatably mounted in the casing or body portion 10 and has one end extending beyond the wall of the casing and provided with a pinion 14 which meshes with the teeth of the rack 15. This rack 15 is slidably connected with the body portion or receptacle 10 by means of the brackets 16 and 17 and is yieldably held in a raised position by spring 18 so that when moved downwardly through the medium of the arm or trigger 19, it will be returned to the raised position by the spring. This trigger 19 is positioned above the upper end of the handle 20 and when the sifter is in use will be engaged by the thumb and pressed downwardly, the spring returning it to the raised position after each depression thus giving the rack a reciprocating movement which will impart an oscillating movement to the agitator and cause the flour to pass through the screen 11.

The closure plates 21 are slidably mounted in the lower portion of the casing 10 beneath the screen 11 upon the guide rods 22, one of which is extended outwardly to provide the brackets 17. These closure plates are limited in their downward movement by the abutment or supporting yokes 23 with which the lower ends of the guide rods are connected as shown in Fig. 1 and from an inspection of this figure it will be seen that the yoke is bent intermediate its length to provide the seat 24 so that these closure plates may extend in overlapping relation to provide a very tight closure. A crank shaft 25 is rotatably mounted in the lower portion of the casing 10 beneath the yoke 23 and is provided with the offset arms 26 with which the actuating rods 27 are connected. These rods 27 are connected with the closures 21 and as the crank shaft 25 is rotated, through the medium of the actuating stem 28 connected with the crank 29, the closures will be moved upwardly thus permitting the flour passing through the screen 11 to pass out through the bottom of the sifter. This plunger 28 is slidably connected with the body portion 10 by the brackets 17 and is provided with a hooked upper end 30 which may be engaged by the forefinger with the thumb engaging the trigger 19. After the plunger 28 is moved upwardly, the doors or closures 21 will be retained in the open position but as soon as the plunger is released, the spring 31 will move the plunger downwardly and the closures will move to a closed position. The sifter can then be placed upon a table without the flour being wasted as any flour which would be jarred through the screen by placing the sifter upon the table would be caught by closures 21 and prevented from passing out through the bottom of the sifter.

I have therefore provided a sifter so constructed the agitator may be easily operated and the closures moved to an open position with one hand and have further a sifter so constructed that the closures may be released and permitted to close by simply releasing the pressure upon the hook 30 prior to moving the sifter from above the bowl into which the flour is being sifted. I have further provided a sifter so constructed that it will operate very efficiently and at the same time will be comparatively cheap in structure and not liable to get out of order.

What is claimed is:—

1. A sifter comprising a body portion, a screening in said body portion, an agitator positioned above said screening, guiding rods mounted in said body portion beneath said screening, closures slidably connected with said guiding rods, a supporting yoke for said closures bent intermediate its length to provide a seat to engage the free edge portion of one of said closures with the closures in overlapping relation when closed, a crank shaft rotatably mounted in said body portion beneath said yoke, rods extending from said crank shaft and connected with said closures, one end of said crank shaft extending through said body portion and bent to provide a handle, an actuating plunger slidably connected with said body portion and connected with the crank handle of said crank shaft, and resilient means yieldably holding said plunger in a lowered position to retain said closures in a set position.

2. A sifter comprising a body portion, a screening in said body portion, an agitator in said body portion above said screening and including a shaft extending through the wall of said body portion, means for rotating said shaft to operate said agitator, a yoke extending through said body portion beneath said screening, guide rods extending from said yoke and connected with said body portion, closure plates positioned in said body portion beneath said screening and limited in their downward movement by said yoke and slidably connected with said guide rods, a crank shaft extending through said body portion, actuating rods connected with said crank shaft and connected with said closure plates for moving the same to an open position, and means for rotating said crank shaft to open and close said closure plates.

3. A sifter comprising a body portion, a screening in said body portion, agitating means positioned above said screening in said body portion, closure plates slidably mounted in said body portion beneath said screening and having their free ends extending in overlapping relation when in a closed position, means in said body portion for limiting the downward movement of said closure plates and supporting the same in a closed position, a crank shaft having offsets, actuating rods connected with the offsets of said crank shaft and with said closure plates for moving the same to an open position when the offsets are swung upwardly and moving the closure plates to a closed position when the offsets are moved downwardly, and means for rotating said crank shaft to move the closures to an open and to a closed position.

4. A sifter comprising a body portion, a screening in said body portion, an agitator in said body portion above said screening, closures movably mounted in said body portion beneath said screening, actuating means for said agitator including a trigger, actuating means for said closures including a plunger provided with a trigger, and a handle for said body portion having its upper end between said triggers.

5. A sifter comprising a body portion having a handle, a screening for said body portion, an agitator in said body portion including an actuating stem extending through said body portion, closures movably mounted in said body portion beneath said screening, actuating means for said closures including a crank shaft extending through said body portion, an operating plunger for the actuating means of said closures positioned beneath the upper end portion of said handle, and operating means for said agitating means including a finger engaging element positioned above the upper end of said handle.

In testimony whereof I affix my signature in presence of two witnesses.

CHRIS ANDERSON.

Witnesses:
  A. J. HORNECKER,
  WM. BARCLAY.

Copies of this patent may be obtained for five cents each, by addressing the "Commissioner of Patents, Washington, D. C."